Figure 2:
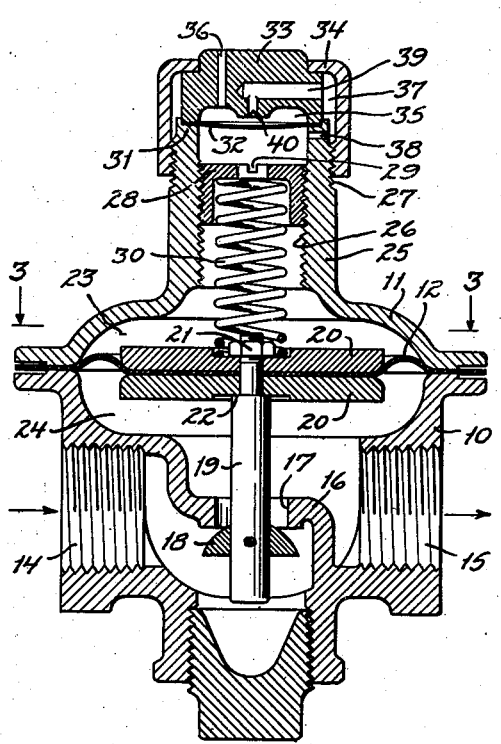

Dec. 19, 1939.　　　R. HUGHES　　　2,183,569

PRESSURE REGULATOR

Filed Sept. 24, 1937

INVENTOR.
RALPH C. HUGHES
BY Bates, Golrick & Teare
ATTORNEYS

Patented Dec. 19, 1939

2,183,569

UNITED STATES PATENT OFFICE 2,183,569

PRESSURE REGULATOR

Ralph C. Hughes, Anderson, Ind., assignor to Reynolds Gas Regulator Company, Anderson, Ind., a corporation of Indiana Application September 24, 1937, Serial No. 165,537

3 Claims. (Cl. 50—4)

This invention relates to pressure regulators and particularly to a diaphragm actuated pressure regulator having an automatic shut-off to prevent the escape of gas consequent upon rupture of the diaphragm. This, therefore, is the general object of the present invention.

A more specific object of this invention is the provision of a gas pressure regulator in which the vent thereof will close consequent upon a rupture of the diaphragm and wherein the regulator will be automatically moved to a wide open position consequent upon the closing of such vent, thus eliminating the effect of the regulator consequent upon an inadvertent rupture of the diaphragm thereby maintaining a flow of gas despite the failure of the regulator.

Another object of the present invention is the provision of an improved gas regulator having an automatic safety shut-off which regulator will be simple in construction, easy to manufacture, which may be sold at a minimum expense to the purchaser, and wherein replacement of the operating parts is facilitated by the simplicity of the valve and parts thereof.

Other objects of the present invention will become more apparent from the following description, reference being had to the drawing wherein preferred forms of the invention are illustrated. The essential novel features of the invention will be summarized in the claims.

Figure 1:
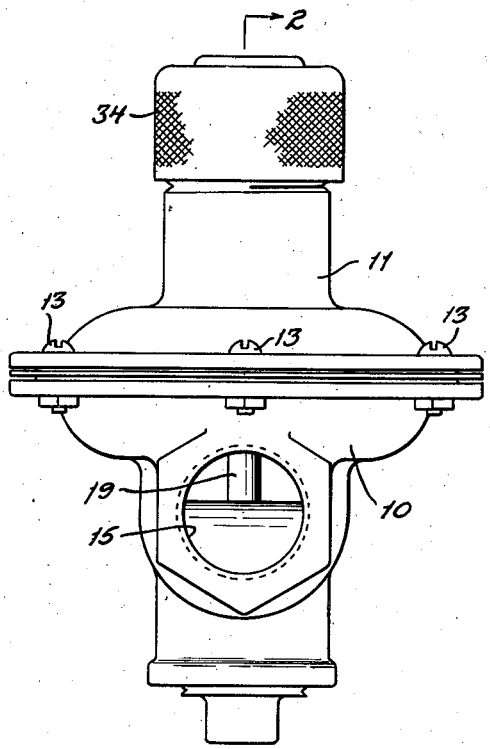
Figure 3:
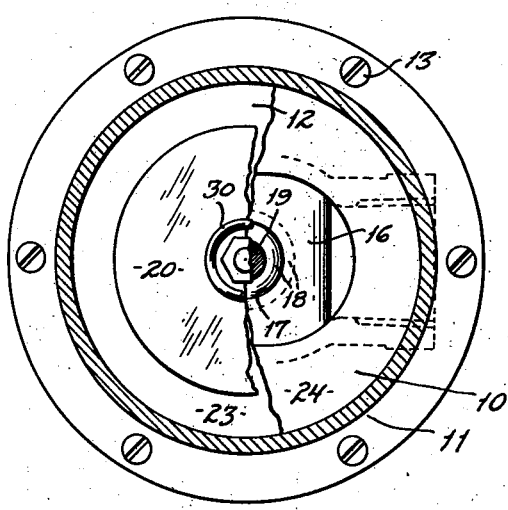
Figure 4:
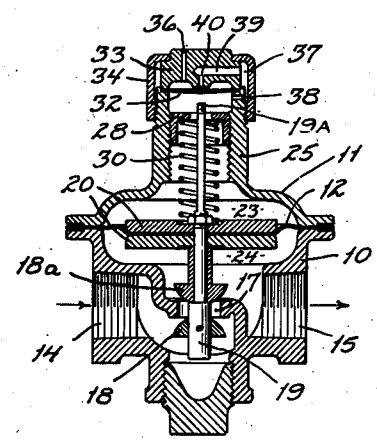

In the drawing, Fig. 1 is an elevation of my improved pressure regulator; Fig. 2 is a vertical section taken through the regulator, as indicated by the lines 2—2 on Fig. 2; Fig. 3 is a horizontal section taken along the lines 3—3 of Fig. 2, certain parts being partially broken away to more clearly illustrate the internal construction of the regulator; and Fig. 4 is a vertical section, similar to Fig. 2 but on a reduced scale, and illustrates a modified form of valve.

Gas regulators, of the type with which this invention is particularly concerned are especially adapted for use in connection with household appliances such as gas ranges, refrigerators, irons and the like. Such appliances require a comparatively low but constant gas pressure as compared with the line pressure. Likewise, some appliances such as refrigerators, require a much lower pressure than other appliances, hence it becomes advantageous to connect the regulator in the gas supply line at a point adjacent the appliance. Indeed in some instances the regulator may be placed within the housing of the appliance.

For the most part, gas regulators comprise a movable diaphragm to which a valve is attached controlling the flow of gas through the supply line. The valve is normally retained open by a spring and is closed by a predetermined pressure of gas on the appliance side of the diaphragm, the other side of the diaphragm is vented to atmosphere. Thus if the diaphragm, which generally comprises a comparatively thin membrane of sheepskin or composition material, is inadvertently ruptured because of prolonged flexing or hidden defects, gas will escape through the rupture and vent. When the regulator is contained within the housing of a gas appliance the escape of gas becomes exceedingly dangerous. Even though the amount of escaping gas is comparatively small it may nevertheless collect within the housing of the appliance and cause serious fires or explosions. The regulator of the present invention prevents the escape of gas and thus insures safe operation of the regulator and is so constructed that it may be made and sold at a low cost.

Referring again to the drawing, and especially to Figs. 1 to 3 inclusive, it will be seen that my improved regulator comprises a lower casing 10 and an upper casing 11. These casings are separated by a sheep skin or other flexible diaphragm 12 and are secured together, as for instance by bolts 13, which due to their clamping action on the two casing members, also serve to maintain the diaphragm in position.

The lower casing 10 has an inlet port 14 and an outlet port 15, both of which are threaded to permit the regulator to be attached in series with the gas supply line in the usual manner. These ports 14 and 15 are separated by a wall 16 having a horizontal portion through which extends a valve opening 17 which may be closed by a valve 18 mounted on a vertically extending valve stem 19 and positioned below the valve opening 17 so that the latter is closed by an upward movement of the valve.

The valve stem 19 is supported by the diaphragm 12. As shown in Fig. 2 a pair of discs or weights 20 embrace the diaphragm and are clamped together by the valve stem 19, which extends through such discs and diaphragm, and threaded at its upper end whereby a nut 21 may clamp the discs and diaphragm against a shoulder 22 formed on the stem 19.

The diaphragm divides the space within the casings into an upper chamber 23 and a lower chamber 24. The lower chamber 24 is in constant communication with the gas in the outlet side of the valve while the upper chamber 23 is normally vented to atmosphere as will be hereinafter more fully explained. Thus the diaphragm normally prevents the escape of gas from the supply line to the upper chamber and into the appliance housing within which the regulator may be positioned.

The gas pressure on the under side of the diaphragm is opposed by the weights of the discs 20 and the pressure of a spring 30. As shown in Fig. 2, the upper casing has a tubular extension 25 which extends upwardly therefrom. This extension is provided with internal threads 26 and external threads 27. Threadingly engaging the threads 26, within the extension 27, is a perforated plug or sleeve 28. The spring 30 extends between the sleeve and the uppermost diaphragm disc 20. The plug is provided with a slot 29 for engagement by a suitable tool to permit the pressure of the spring 30 against the diaphragm to be adjusted and thus to permit an adjustment of the maximum pressure on the outlet side of the regulator.

The upper end of the extension 25 is provided with a seat 31 which supports a second diaphragm 32. This diaphragm 32 is clamped against the seat 31 by a cap 33 which is maintained in engagement therewith by a sleeve or cap 34 which threadingly engages the external threads 27 of the extension 25.

The diaphragm extends across the upper opening in the extension 25 closing the same to the atmosphere and provides a chamber 35 between the inner face of the caps and the diaphragm. This chamber is in constant communication with the atmosphere by means of a comparatively small passageway 36.

The diaphragm 32 may be of any flexible material which is impervious to gas, as for instance a sheep skin disc. Normally this disc assumes the position shown in Fig. 2 by reason of its own weight.

As heretofore mentioned the chamber 23, above the main diaphragm 12 is vented to atmosphere. As shown in Fig. 2 the upper end of the sleeve 34 is internally enlarged providing an annular chamber 37 between it and the extension 25 as well as the cap 34. This chamber extends downward to a point below the plane of the diaphragm seat 31 and is in constant communication with the interior of the extension 25, and thus the chamber 23, by reason of a passageway 38 in the side wall of the extension 25. This passageway 38, for a purpose hereinafter to be explained is smaller in cross-sectional area than the passageway 36 in the cap 33 previously described.

Normally a passageway 39 in the cap 33 maintains the chamber 37 also in communication with the chamber 35 between the cap 33 and the supplemental diaphragm 32, and thus in communication with atmosphere through the chamber 37 and the passageway 36 heretofore described. This passageway has a downwardly facing port 40 adapted to be closed by the supplemental diaphragm, consequent upon the inadvertent rupture of the diaphragm thus closing the vent between chamber 24 and the exterior of the valve casing.

In the normal operation of the valve the main diaphragm 12 flexes in response to the gas pressure in the outlet line thus raising and lowering the valve 18 relative to its port 17 thereby regulating the pressure of the gas at the outlet side of the valve. During the normal fluctuation of the main diaphragm, the chamber 23, thereabove, is vented to the atmosphere through the hollow sleeve and around the impervious supplemental diaphragm 32 through the passageway 38, the chamber 37 and the passageway 39, thence into the chamber 35 and through the passageway 36 to the exterior of the valve. The arrangement of the supplemental diaphragm 32, and the various passageways is such that the supplemental diaphragm is unaffected by the normal fluctuations of the main diaphragm, thus insuring proper breathing of the valve under normal operating conditions.

When the main diaphragm ruptures, the gas flows therethrough raising the pressure in the chamber 23 and, due to the restrictive size of the passageway 38, this increased pressure raises the supplemental diaphragm against the port 40 of the passageway 39 thus closing the egress of gas from the valve chamber 23. Continued seepage of gas through the ruptured diaphragm further increases the pressure in the chamber 23 until it is equal to the inlet pressure of the valve. The weight of the discs 20 and the pressure of the spring 30 therefore act to maintain the valve 18 wide open. Thus, for all practical purposes the regulator valve is rendered inactive permitting the gas appliance to be used until the valve can be repaired by replacing the diaphragm, the increased pressure at the appliance serving to notify the user that such replacement is required.

While I have described the supplemental diaphragm as being made of sheep skin or other impervious material, I sometimes prefer to make such diaphragm of a comparatively thin resilient spring metal, such as steel or brass. Such diaphragm is dished substantially as the diaphragm 32 is shown in Fig. 2 and when subjected to gas pressure on its under side, due to the rupture of the main diaphragm 12, springs upwardly reversing the direction of the dish therein and closing the port 40. Such a metal diaphragm has advantages over the leather diaphragm in that it is much less responsive to rupture, thus increasing the safety of the valve, and also permits the use of the valve in an inverted position without requiring additional parts. In fact a metallic supplemental diaphragm operates equally as well regardless of the position of the valve and hence provides a fool proof safety shut off which is operative even though the installation of the regulator should be faulty, that is out of a normally vertical position; and this is accomplished without adding any parts to the valve mechanism.

In Fig. 4, I illustrate a modified form of valve. This modified valve includes all of the elements and parts heretofore described in connection with Figs. 1 to 3 inclusive. These parts are therefore given the same reference numerals and need not be described in detail again. In addition to the parts heretofore described, the valve illustrated in Fig. 4 is provided with a second valve member 18A. This valve member is secured to the valve stem 19 above the valve port 17 between the inlet and outlet openings of the valve.

The normal operation of the modified form of valve is substantially the same as that heretofore described in connection with the valve shown in Figs. 1 to 3 inclusive. However, when the main diaphragm 12 inadvertently ruptures the lowering of the valve stem, as heretofore described causes the valve member 18A to close the valve port 17 thus entirely cutting off the flow of gas to the appliance. Likewise, if for any reason the flow of gas into the valve is stopped the absence of gas pressure under the main diaphragm 12 will permit the spring 30 to cause the valve member 18A to close the port 17, and maintain it closed even though the main line pressure to the valve be restored. In this form of valve the valve stem 19 is provided with an auxiliary stem 19A which extends upwardly through the sleeve 28 so that when the cap 33 and supplemental diaphragm 32 have been removed, this stem extension may be grasped to raise the valve stem and place the valve in operation.

The valve shown in Fig. 4 is advantageously used under conditions where the main or inlet gas line pressure is so high that it might be dangerous to open the regulator full consequent upon the rupture of the diaphragm, or where the inlet pressure fluctuates to such an extent that the flame of the accessory might be extinguished due to the lack of pressure. In the latter instances the valve of Fig. 4 not only prevents the dangers which might result from an inadvertent rupture of the regulator diaphragm, but also prevents those dangers which might result from an abnormal reduction of line pressure and consequent extinguishing of the appliance flame.

I claim:

1. A safety seal for a gas pressure regulator of the type having a casing and a substantially enclosed chamber, one wall of which comprises a pressure responsive diaphragm adapted and arranged to actuate a valve member, said seal comprising a supplemental gas impervious diaphragm closing the upper end of the chamber in the regulator casing, a hollow cap, a sleeve secured to said casing and adapted and arranged to clamp said cap and supplemental pressure responsive diaphragm thereon, a restricted but normally open passageway extending from said chamber through said casing and sleeve into said hollow cap, a second passageway extending through the hollow cap and communicating with open air, said supplemental diaphragm being actuatable consequent upon the presence of gas pressure in said chamber between such diaphragm and the regulator diaphragm to be moved to a position to stop the flow of gas through said passageway.

2. A safety seal for a gas pressure regulator of the type having a casing providing a substantially enclosed chamber, one wall of which comprises a pressure responsive diaphragm adapted and arranged to actuate a valve member, said seal comprising a supplemental gas impervious pressure responsive diaphragm extending across the upper end of said chamber, a hollow cap, a sleeve removably secured to the casing and adapted and arranged to clamp said cap and supplemental diaphragm thereon, a restricted passageway extending from the chamber in the casing through the casing and said sleeve into said hollow cap, a second passageway extending through the hollow cap and communicating with open air, said supplemental diaphragm being actuatable consequent upon the flow of gas into the chamber between the two diaphragms to move to a position to stop the flow of gas through the first-named passageway into the hollow cap.

3. A safety seal for a gas pressure regulator of the type having a casing providing a chamber, one wall of which comprises a pressure responsive gas impervious diaphragm adapted and arranged to actuate a valve member, wherein the chamber is open at its upper end, said seal comprising a supplemental gas impervious metallic diaphragm extending across the upper end of said chamber and closing the opening therein, a hollow cap removably positioned above the supplemental diaphragm, a sleeve threadingly secured to said casing and adapted and arranged to clamp said cap and second-named diaphragm thereon, a restricted passageway extending from said non-pressure chamber between the regulator diaphragm and the supplemental diaphragm through the regulator casing and sleeve into said hollow cap above the supplemental diaphragm, a second passageway extending through the hollow cap and communicating with open air, said supplemental diaphragm being normally spaced from said cap actuatable automatically consequent upon the presence of gas pressure therebeneath to raise to a position to abut said cap and stop the flow of gas through the first-named passageway into the hollow cap.

RALPH C. HUGHES.